UNITED STATES PATENT OFFICE.

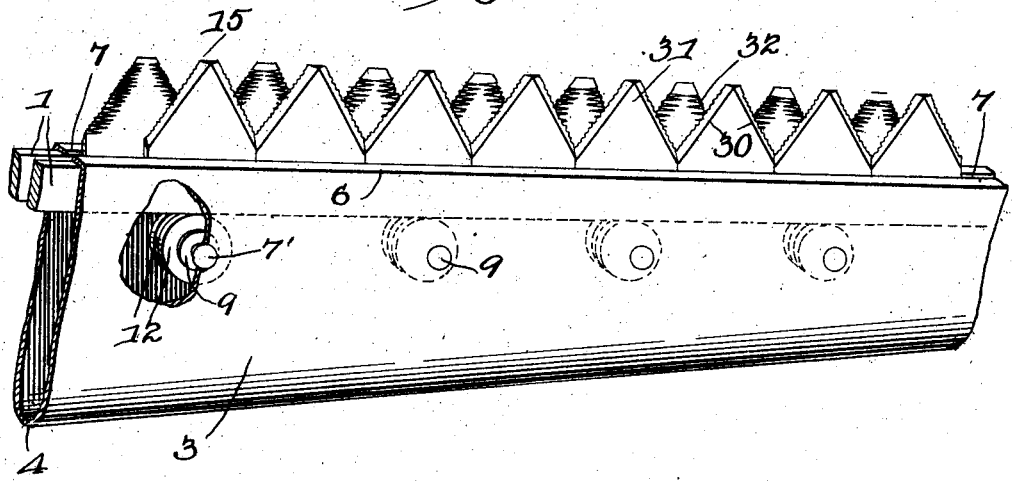

WILLIAM R. CLARKSON, OF TENINO, WASHINGTON.

CUTTING APPARATUS FOR HARVESTERS.

No. 834,969.  Specification of Letters Patent.  Patented Nov. 6, 1906.

Application filed January 31, 1906. Serial No. 298,868.

*To all whom it may concern:*

Be it known that I, WILLIAM R. CLARKSON, a citizen of the United States, residing at Tenino, in the county of Thurston and State of Washington, have invented a new and useful Cutting Apparatus for Harvesters, of which the following is a specification.

This invention relates to cutting apparatus for harvesters and mowing-machines; and it has for its objects to simplify and improve the construction and operation of this class of devices and to present a cutting apparatus which shall be free from danger of grass or grain becoming entangled therewith and interfering with the operation.

Another object of the invention is to provide an improved casing for the cutting apparatus which shall be simple in construction and effective in operation.

Another object of the invention is to provide improved antifriction-bearings for the cutter-bar.

Still another object of the invention is to improve the knives or cutters with a view of increasing their effectiveness.

With these and other ends in view the invention consists in the improved construction and novel arrangement and combination of parts, which will be hereinafter fully described, and particularly pointed out in the claims.

In the accompanying drawings there have been illustrated certain simple and preferred forms of the invention, and in said drawings—

Figure 1 is a perspective view of a portion of a cutting apparatus constructed in accordance with the principles of the invention and equipped with two cutter-bars, parts having been broken away for the purpose of exposing the construction more fully. Fig. 2 is a transverse sectional view of the form of cutting apparatus shown in Fig. 1. Fig. 3 is a transverse sectional view illustrating a form of cutting apparatus having a single cutter-bar, but otherwise constructed on the lines of the present invention. Fig. 4 is a sectional view illustrating a form of cutting apparatus having two cutter-bars, but showing a modified form of casing. Fig. 5 is a detail plan view of one of the knives or cutters.

Corresponding parts in the several figures are indicated throughout by similar characters of reference.

The present invention is equally applicable to cutting apparatus employing two oppositely-reciprocatory cutter-bars, as shown at 1 1 in Figs. 1, 2, and 4 of the drawings, and to apparatus having a single cutter-bar, as shown at 2 in Fig. 3. In either case a sheet-metal casing is employed forming a housing for the cutter bar or bars and having a slot through which the knives or cutters may project.

Referring to Figs. 1 and 2 of the drawings, 3 designates the casing or housing, which is bent from a single strip of sheet metal, so as to form the curved back portion 4 and the side members or leaves 5 5, which latter are provided with flanges 6 6, extending in the direction of each other and leaving between them a slot or opening 7. The side members 5 5 are connected by means of bolts 7', having spacing-sleeves 8 and thin washers 9 9, which are interposed between the ends of the spacing-sleeves and the inner sides of the leaves or side members 5 5, so that by tightening the nuts 10 upon the bolts 7' the parts will be securely assembled. Upon the sleeves 8 are journaled antifriction disks or rollers 12 12, which are spaced apart by an intermediate washer 11. By mounting said antifriction-rollers upon the sleeve 8 they will be prevented from binding when the nuts 10 are tightened upon the bolts, since the sleeves 8, which are made of proper length, will prevent the sides of the housing or the washers 9 from being tightened against the antifriction members.

The cutter-bars 1 1 are placed within the housing with their backs bearing upon the antifriction-rollers. The blades or knives 15, which are secured in the usual manner upon the cutter-bars, project through the slot 7, and the rear edges of said knives or blades are extended rearward of the cutter-bars, so as to lie between the opposing faces of the antifriction disks or rollers 12, as clearly seen in Fig. 2 of the drawings, thus supporting the cutter-bars in position for operation, the knives or blades being guided in the slot 7 and between the faces of the antifriction members. By this arrangement of the cutter-bars said bars will be supported free from contact with the housing, except at their front edges, which are disposed in engagement with the flanges 6; but inasmuch as the strain when the device is in operation is in a rearward direction upon the cutter-bars the friction will be greatly reduced and the operation of the cutting apparatus correspondingly facilitated. The housing is supported and the cutter-bars are operated in the usual well-known manner, which does not constitute a part of the present invention.

Under the modification illustrated in Fig. 3 of the drawings the casing or housing is constructed substantially like the casing 3, (shown in Figs. 1 and 2;) but of the sides of the casing, which are here designated 16 and 17, only one, 16, is provided with a flange 18, which is spaced from the opposite side member to afford a slot for the passage of the knives or blades 19 of the single cutter-bar 20. The connecting-bolts, of which only one (designated 21) appears in the drawings, are each intended to be provided with a spacing-sleeve 22 and washers 23, an antifriction-roller 24, journaled upon the sleeve 22, affording a bearing for the back of the cutter-bar 2.

Under the modification illustrated in Fig. 4 of the drawings the construction is identical with that employed in Figs. 1 and 2, with the exception that the casing, which is here designated 25, is constructed of two separate pieces of sheet metal 26 and 27, forming the opposite sides of the housing and provided with flanges 28, corresponding with the flanges 6 in Figs. 1 and 2. The side member 26 of the casing is bent to form the back 29, which abuts upon the side member 27. The construction and arrangement of the connecting means, the antifriction means, and the cutter-bars is identical with that shown in Figs. 1 and 2, and the same numerals are employed to designate the different parts.

The invention, as will be seen from the foregoing description, is equally applicable to cutting apparatus equipped with single and with double cutter-bars, and the cutter-bars will be completely inclosed and protected from contact with the material that is being cut. The customary sickle-bar straps, which are a frequent source of inconvenience by becoming entangled with grass, straw, and weeds, are entirely dispensed with, and sharp projections and obstructions are avoided. After a period of wear slack resulting therefrom may be taken up by simply removing one of the thin washers 9, after which the parts may be reassembled and connected as tightly as when the apparatus was new.

While the improved cutting apparatus herein described may be used with knives or blades of any description, it is preferred to use so-called "bearded" blades 31, of the character specifically shown in Fig. 5 of the drawings, said blades having beveled edges, as shown at 30 in Fig. 1 of the drawings, while the flat smooth sides of said blades are provided with transversely-disposed grooves, channels, or serrations, as 32, which are preferably triangular in cross-section and of greatest depth at the edges of the blades in the direction of which they are inclined. The blades are thus practically provided with numerous minute saw-teeth, whereby their effectiveness in operation is greatly increased. At the same time the blades may be readily ground or sharpened in the ordinary manner, since the channels, grooves, and serrations are formed upon the flat sides of the blades, the beveled sides of the latter being readily operated upon by means of an ordinary grindstone or emery-wheel.

Having thus described the invention, what is claimed is—

1. In a cutting apparatus, a sheet-metal housing having side members spaced apart to form a slot, bolts connecting the side members, spacing-sleeves upon the bolts, pairs of spaced antifriction members upon the sleeves, cutter-bars within the housing bearing upon the antifriction members, and blades upon the cutter-bars projecting through the slot in the housing and extended rearwardly between the faces of the antifriction members.

2. In a cutting apparatus, a sheet-metal housing having side members and a back said side members being provided with flanges spaced apart to form a slot, bolts connecting the side members, spacing-sleeves and washers upon said bolts, pairs of antifriction members supported for rotation upon the spacing-sleeves between the washers, spacing means between the antifriction members, cutter-bars within the housing bearing upon the antifriction members, and blades upon the cutter-bars projecting through the slot in the housing and extended rearwardly between the faces of the antifriction members.

In testimony that I claim the foregoing as my own I have hereto affixed my signature in the presence of two witnesses.

WILLIAM R. CLARKSON.

Witnesses:
P. C. KIBBE,
V. G. KETCHAM.